(12) United States Patent
Ostromecki et al.

(10) Patent No.: US 12,448,907 B2
(45) Date of Patent: Oct. 21, 2025

(54) DUAL MODE MUFFLER

(71) Applicant: Tenneco Automotive Operating Company LLC, Northville, MI (US)

(72) Inventors: Gabriel Ostromecki, Ann Arbor, MI (US); Nicholas Reding, Mason, MI (US); Isidro L. Hernandez, Ypsilanti, MI (US)

(73) Assignee: Tenneco Automotive Operating Company LLC, Northville, MI (US)

( * ) Notice: Subject to any disclaimer, the term of this patent is extended or adjusted under 35 U.S.C. 154(b) by 0 days.

(21) Appl. No.: 18/801,915

(22) Filed: Aug. 13, 2024

(65) Prior Publication Data

US 2025/0067201 A1 Feb. 27, 2025

Related U.S. Application Data

(60) Provisional application No. 63/534,472, filed on Aug. 24, 2023.

(51) Int. Cl.
*F01N 1/02* (2006.01)
*F01N 1/00* (2006.01)
*F01N 1/04* (2006.01)
*F01N 1/16* (2006.01)

(52) U.S. Cl.
CPC ............ *F01N 1/02* (2013.01); *F01N 1/006* (2013.01); *F01N 1/026* (2013.01); *F01N 1/04* (2013.01); *F01N 1/161* (2013.01); *F01N 1/163* (2013.01); *F01N 1/166* (2013.01); *F01N 2490/15* (2013.01)

(58) Field of Classification Search
CPC . F01N 1/006; F01N 1/02; F01N 1/026; F01N 1/04; F01N 1/161; F01N 1/163; F01N 1/166; F01N 2490/15
See application file for complete search history.

(56) References Cited

U.S. PATENT DOCUMENTS

| | | | | |
|---|---|---|---|---|
| 5,979,583 A | * | 11/1999 | Amino | F01N 1/08 181/251 |
| 2002/0033302 A1 | * | 3/2002 | Kaneko | F01N 1/165 181/275 |
| 2020/0400060 A1 | * | 12/2020 | Barot | F01N 13/04 |

FOREIGN PATENT DOCUMENTS

| | | | | |
|---|---|---|---|---|
| JP | H036804 Y2 | * | 2/1991 | F01N 1/08 |
| JP | H0754574 Y2 | * | 12/1995 | F01N 7/02 |

* cited by examiner

*Primary Examiner* — Audrey B. Walter
(74) *Attorney, Agent, or Firm* — Harness, Dickey & Pierce, P.L.C.

(57) ABSTRACT

A muffler assembly for a vehicle exhaust system including a muffler that has a primary muffler conduit with a primary resonator, a secondary muffler conduit with a secondary resonator, and a valve that directs exhaust flow through both the primary and secondary muffler conduits or primarily through the secondary muffler conduit depending on the position of the valve. The muffler provides a first level of sound attenuation when the valve is in an open position and a second level of sound attenuation when the valve is in a closed position. The second level of sound attenuation is greater than the first level of sound attenuation and therefore the muffler provides a louder exhaust sound when the valve is in the open position and a quieter exhaust sound when the valve is in the closed position.

5 Claims, 9 Drawing Sheets

Assembling the primary resonator by positioning the first pinch can over the primary muffler conduit
Step 1A Securing the upstream and downstream first pinch can ends to the primary conduit wall
Step 2A Positioning the second pinch can over the primary muffler conduit until the upstream second pinch can end receives the downstream first pinch can end in a slip fit / abutting arrangement
Step 3A Securing the upstream second pinch can end to the first pinch can wall and securing the downstream second pinch can end to the primary conduit wall
Step 4A Connecting the downstream secondary conduit end to the pinch can inlet on the second pinch can to form a junction between the primary and secondary muffler conduits inside the muffler housing
Step 5A Connecting the upstream primary conduit end to the primary inlet aperture in the inlet header
Step 6A Connecting the upstream secondary conduit end to the secondary inlet aperture in the inlet header
Step 7A Installing the primary and secondary muffler conduits and the first and second pinch cans inside the outer shell of the muffler housing
Step 8A Connecting the downstream primary conduit end to the single outlet aperture in the outlet header
Step 9A

*Fig-5*

Positioning the downstream first pinch can end into the upstream second pinch can end in a slip fit to form an abutting arrangement between the first and second pinch cans
Step 1B Securing the downstream first pinch can end to the upstream second pinch can end
Step 2B Positioning the first and second pinch cans over the primary muffler conduit to form the primary resonator and the diffusion chamber
Step 3B Securing the upstream and downstream first pinch can ends and the downstream second pinch can end to the primary conduit wall
Step 4B Connecting the downstream secondary conduit end to the pinch can inlet on the second pinch can to form a junction between the primary and secondary muffler conduits inside the muffler housing
Step 5B Connecting the upstream primary conduit end to the primary inlet aperture in the inlet header
Step 6B Connecting the upstream secondary conduit end to the secondary inlet aperture in the inlet header
Step 7B Installing the primary and secondary muffler conduits and the first and second second pinch cans inside the outer shell of the muffler housing
Step 8B Connecting the downstream primary conduit end to the single outlet aperture in the outlet header
Step 9B

*Fig-6*

DUAL MODE MUFFLER

CROSS-REFERENCE TO RELATED APPLICATIONS

This application claims the benefit of U.S. Provisional Application No. 63/534,472, filed on Aug. 24, 2023. The entire disclosure of the application referenced above is incorporated herein by reference.

FIELD

The present disclosure relates to vehicle exhaust systems and more particularly to exhaust system mufflers and methods of manufacturing exhaust system mufflers.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engine equipped vehicles typically route the exhaust flow produced by the engine through a series of conduits commonly referred to as the vehicle's exhaust system. Exhaust flow through the exhaust system generally increases with increasing engine speed, which changes the volume and note of the sound produced by the exhaust flow as it passes through the exhaust system. Many vehicle exhaust systems use active valves to alter the sound level and/or or sound characteristics (e.g., pitch) produced by the exhaust system during operation of the vehicle. Many vehicle manufacturers and exhaust system manufacturers refer to such systems as "Sport Exhaust" because they are popular options amongst motorsport enthusiast who desire a louder or "sportier" exhaust sound. Active valves (e.g., electromechanical valves) can be placed in the exhaust system to direct exhaust flow into different conduits and/or chambers of the exhaust system to make the exhaust noise louder or quieter at the driver's discretion. Typically, these active valves are controlled by the push of a button or other user interface in the vehicle's interior.

SUMMARY

This section provides a general summary of the disclosure and is not a comprehensive disclosure of its full scope or all of its features.

In accordance with one aspect of the subject disclosure, a muffler assembly for a vehicle exhaust system is provided that includes a muffler that has a primary muffler conduit with a primary resonator, a secondary muffler conduit with a secondary resonator, and a valve that directs exhaust flow through both the primary and secondary muffler conduits or through only the secondary muffler conduit depending on the position of the valve. The primary resonator has a primary resonator chamber and the secondary resonator has a secondary resonator chamber. The primary muffler conduit passes through the primary resonator chamber to define a primary exhaust flow path through the muffler. The secondary muffler conduit extends through at least part of the secondary resonator chamber to define a secondary exhaust flow path within the muffler.

The valve is positioned upstream of the primary resonator and is actuatable between an open position and a closed position. Thus, exhaust flow through both the primary muffler conduit and primary exhaust flow path and through the secondary muffler conduit and secondary exhaust flow path is permitted when the valve is in the open position, which provides a first operating mode. The muffler therefore provides a first level of sound attenuation in the first operating mode. The valve restricts exhaust flow through the primary muffler conduit and primary exhaust flow path in the closed position such that more than 50 percent of the exhaust flow is directed through the secondary muffler conduit and secondary exhaust flow path when the valve is in the closed position, which provides a second operating mode. The muffler therefore provides a second level of sound attenuation in the second operating mode. The second level of sound attenuation is greater than the first level of sound attenuation. As a result, the muffler provides a louder exhaust sound (i.e., higher decibels) in the first operating mode and a quieter exhaust sound (i.e., lower decibels) in the second operating mode.

In accordance with this aspect of the disclosure, the primary resonator has a primary resonator cross-sectional area (A1) and the primary muffler conduit has a primary muffler conduit cross-sectional area (a1) that is smaller than the primary resonator cross-sectional area (A1). The secondary resonator has a secondary resonator cross-sectional area (A2) and the secondary muffler conduit has a secondary muffler conduit cross-sectional area (a2) that is smaller than the secondary resonator cross-sectional area (A2). The sizes of the primary and secondary resonators and the primary and secondary muffler conduits are selected such that a primary area ratio (A1/a1) of the primary resonator cross-sectional area (A1) divided by the primary muffler conduit cross-sectional area (a1) is smaller than a second area ratio (A2/a2) of the secondary resonator cross-sectional area (A2) divided by the secondary muffler conduit cross-sectional area (a2). This particular design specification enables the second (quieter) operating mode of the muffler to reduce the sound level produced by the vehicle exhaust system at any given engine speed (rpms) without having a substantial impact on the exhaust note (i.e., the frequency, pitch, resonance, burble, etc.). As a result, the acoustic characteristics of the exhaust note remain the same in the first and second operating modes, the exhaust sound is just quieter (i.e., is at lower decibel levels) in the second operating mode.

In accordance with another aspect of the subject disclosure, a muffler assembly for a vehicle exhaust system is provided that includes a muffler that has a primary muffler conduit with a primary resonator, a secondary muffler conduit with a secondary resonator, and a valve that directs exhaust flow through both the primary and secondary muffler conduits or primarily through the secondary muffler conduit depending on the position of the valve. The primary muffler conduit, the primary resonator, the secondary muffler conduit, and the secondary resonator are positioned inside a muffler housing. More particularly, the primary muffler conduit passes through the primary resonator and the muffler housing to define a primary exhaust flow path through the muffler. The secondary muffler conduit extends within the muffler housing to define a secondary exhaust flow path within the muffler.

Again, the valve is positioned upstream of the primary resonator and is actuatable between an open position and a closed position. Thus, exhaust flow through both the primary muffler conduit and primary exhaust flow path and through the secondary muffler conduit and secondary exhaust flow path is permitted when the valve is in the open position, which provides a first operating mode. The muffler therefore provides a first level of sound attenuation in the first operating mode. The valve restricts exhaust flow through the primary muffler conduit and primary exhaust flow path in the closed position such that more than 50 percent of the exhaust flow is directed through the secondary muffler conduit and secondary exhaust flow path when the valve is in the closed position, which provides a second operating mode. The muffler therefore provides a second level of sound attenuation in the second operating mode. The second level of sound attenuation is greater than the first level of sound attenuation. As a result, the muffler provides a louder exhaust sound (i.e., higher decibels) in the first operating mode and a quieter exhaust sound (i.e., lower decibels) in the second operating mode.

In accordance with this aspect of the disclosure, the primary resonator is formed by a first pinch can that is positioned inside the muffler housing and over the primary muffler conduit such that a primary resonator chamber is formed between the primary muffler conduit and the first pinch can. The secondary resonator includes a secondary resonator chamber that is formed between the first pinch can and the muffler housing. The secondary muffler conduit is connected in fluid communication with the first muffler conduit at a second pinch can that is positioned inside the muffler housing. The second pinch can abuts the first pinch can and is positioned over the primary muffler conduit such that a diffusion chamber is formed between the primary muffler conduit and the second pinch can. The primary muffler conduit includes circumferentially spaced openings that permit exhaust flow passing through the secondary muffler conduit and the diffusion chamber in the second pinch can to enter the primary muffler conduit with reduced turbulence and flow noise.

In accordance with another aspect of the subject disclosure, a method of assembling the muffler assemblies described above is provided. The method includes the steps of: assembling a primary resonator by positioning a first pinch can over a primary muffler conduit, connecting the primary muffler conduit to a primary inlet aperture in an inlet header of a muffler housing, and connecting a secondary muffler conduit to a secondary inlet aperture in the inlet header of the muffler housing. The method also includes the steps of installing the primary muffler conduit and the secondary muffler conduit inside an outer shell of the muffler housing to form a secondary resonator inside the muffler housing and connecting the primary muffler conduit to a single outlet aperture in an outlet header of the muffler housing.

The method also includes the steps of positioning a second pinch can over the primary muffler conduit to form a diffusion chamber between the primary muffler conduit and the second pinch can, positioning the second pinch can in an abutting arrangement with the first pinch can, and securing the second pinch can to the first pinch can. In accordance with these steps, the diffusion chamber is arranged in fluid communication with the primary muffler conduit through circumferentially spaced openings in the primary muffler conduit. The method further comprises the step of connecting the secondary muffler conduit in fluid communication with a pinch can inlet on the second pinch can to form a junction between the primary and secondary muffler conduits inside the muffler housing.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a flow diagram illustrating one exemplary method of assembling the exemplary muffler assembly illustrated in FIG. 2;

FIG. 6 is another flow diagram illustrating another exemplary method of assembling the exemplary muffler assembly illustrated in FIG. 2;

In the drawings, reference numbers may be reused to identify similar and/or identical elements.

DETAILED DESCRIPTION

Figure 1:
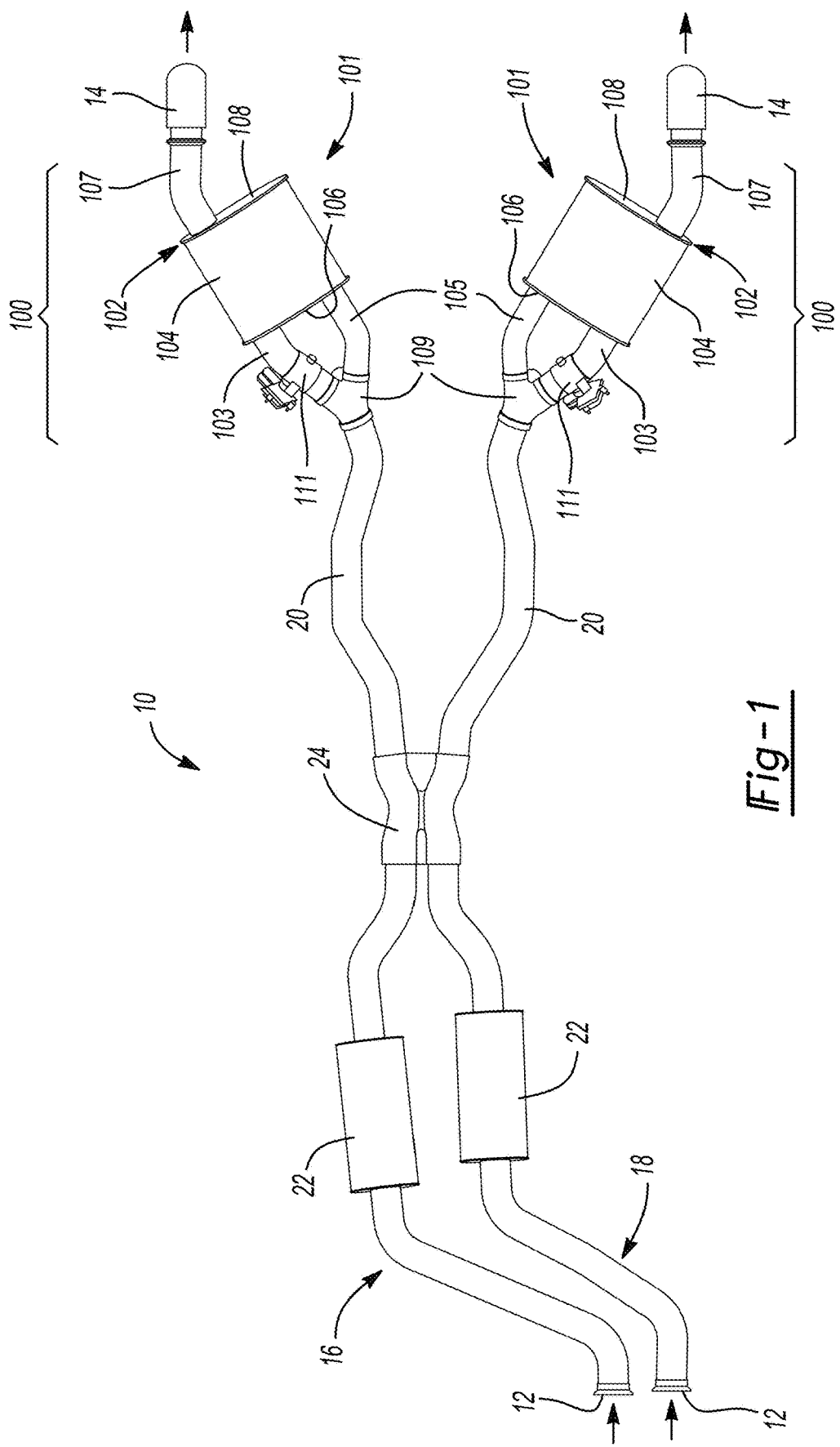
FIG. 1 is a top plan view of an exemplary vehicle exhaust system equipped with muffler assemblies that have been constructed in accordance with the present disclosure.

Referring to the Figures, wherein like numerals indicate corresponding parts throughout the several views, muffler assemblies 100, 200 for a vehicle exhaust system 10 are disclosed.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, an exemplary vehicle exhaust system 10 is illustrated. The vehicle exhaust system 10 shown is an automotive exhaust system that is designed to carry exhaust produced by an internal combustion engine from one or more exhaust inlets 12 located at the front of the vehicle exhaust system 10 to one or more exhaust outlets 14 located at the rear of the vehicle exhaust system 10. In FIG. 1, the vehicle exhaust system 10 includes a first exhaust run 16 that is positioned closer to the right side of the vehicle and a second exhaust run 18 that is positioned closer to the left side of the vehicle. In FIG. 1, each exhaust run 16, 18 has one inlet 12 and one outlet 14, one or more exhaust pipe sections 20, and a resonator 22. The vehicle exhaust system 10 shown in FIG. 1 also includes a mixing section 24 such as an X-pipe that connects the first and second exhaust runs 16, 18 in fluid communication with one another. It should be appreciated that the inlets 12 are configured to be connected to the outlets of catalytic converters, exhaust headers, downpipes, or other exhaust system components and therefore receive exhaust gases and heat produced by the internal combustion engine. The outlets 14 are open to the atmosphere and therefore release the exhaust gases and heat into the environment. Each of the exhaust runs 16, 18 shown in FIG. 1 has one resonator 22 located upstream of the mixing section 24 (i.e., located between the inlet 12 and the mixing section 24) and a muffler assembly 100 located downstream of the mixing section 24 (i.e., located between the mixing section 24 and the outlet 14). The muffler assemblies 100 are specifically designed to provide a first operating mode with a louder exhaust sound and a second operating mode with a quieter exhaust sound for any given engine speed (rpms) without changing the acoustic characteristics of the exhaust sound (i.e., the frequency, pitch, resonance, burble, etc.) other than the sound level (dBs).

The vehicle exhaust system 10 shown in FIG. 1 is particularly designed for use in automobiles equipped with an inline six cylinder engine with twin turbochargers, where one turbocharger receives exhaust from three of the six cylinders and the other turbocharger receives exhaust from the other three cylinders. Thus, the downpipe from one of the turbochargers carries exhaust from three of the cylinders to the inlet 12 of the first exhaust run 16 and the downpipe from the other turbocharger carries exhaust from the other three cylinders to the inlet 12 of the second exhaust run 18. One particular problem the inventors faced during the development of the muffler assemblies 100, 200 described below was how to produce a muffler assembly that provides both loud and quiet operating modes without changing the character of the exhaust note when switching between the two different operating modes. A secondary problem that the inventors faced was how to make such a muffler assembly that feeds a single outlet 14 per exhaust run 16, 18.

While the development of the muffler assemblies 100, 200 described herein was carried out with the particular exhaust system arrangement depicted in FIG. 1 and the associated problems described above, it should be appreciated that FIG. 1 illustrates just one exemplary configuration for a vehicle exhaust system 10 and that many other exhaust system configurations are possible, including without limitation, exhaust system configurations that do not have the resonators 22 and/or mixing section 24 illustrated in FIG. 1, exhaust systems where each exhaust run 16, 18 has multiple outlets 14, and exhaust systems that have only one exhaust run instead of the two exhaust runs 16, 18 illustrated in FIG. 1. As a result, the muffler assemblies 100, 200 shown and described herein may be utilized in a wide variety of vehicle exhaust systems and are not limited in application to the exemplary vehicle exhaust system 10 shown in FIG. 1.

Still referring to FIG. 1, each muffler assembly 100 includes a muffler 101. The muffler 101 includes a muffler housing 102 with an outer shell 104 that has a substantially oval cross-sectional shape and is closed at inlet and outlet ends by an inlet header 106 and an outlet header 108. Each muffler assembly 100 also includes a primary inlet pipe 103 and a secondary inlet pipe 105 that are connected to the inlet header 106 of the muffler 101 and a single outlet pipe 107 that is connected to the outlet header 108. The primary and secondary inlet pipes 103, 105 are connected at a junction 109, which places the primary and secondary inlet pipes 103, 105 in fluid communication with exhaust pipe section 20 in each of the first and second exhaust runs 16, 18. The primary inlet pipe 103 has a larger diameter than the secondary inlet pipe 105. An active, electromechanical valve 111 is positioned in the primary inlet pipe 103 and is actuatable between an open position where exhaust flow through the primary inlet pipe 103 is permitted and a closed position where the active, electromechanical valve 111 obstructs and therefore restricts exhaust flow through the primary inlet pipe 103. As will be explained in greater detail below, the open position of the active, electromechanical valve 111 provides a first operating mode where exhaust flows into the muffler assembly 100 through both the primary and secondary inlet pipes 103, 105 and where the sound attenuation provided by the muffler assembly 100 is minimal to produce a loud exhaust sound. The closed position of the active, electromechanical valve 111 provides a second operating mode where all or a majority (i.e., more than 50 percent) of the exhaust flow into the muffler assembly 100 is through the secondary inlet pipe 105, which results in greater sound attenuation by the muffler assembly 100 compared to the first operating mode and a quieter exhaust sound that still maintains the same exhaust note, but at lower decibel levels (dBs).

Figure 2:
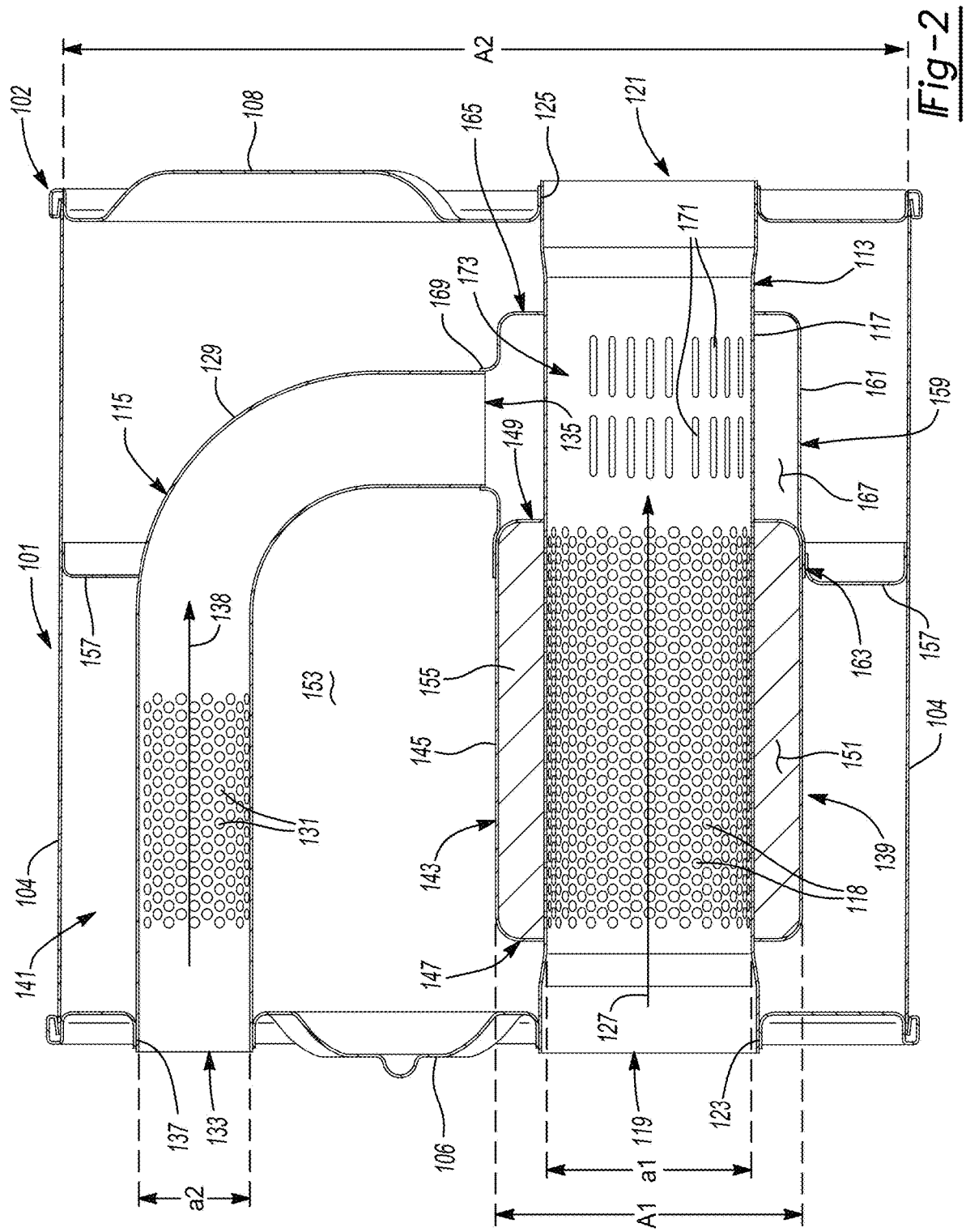
FIG. 2 is a top cross-sectional view of one of the exemplary muffler assemblies illustrated in FIG. 1.

With additional reference to FIG. 2, the muffler 101 includes a primary muffler conduit 113 and a secondary muffler conduit 115. The primary muffler conduit 113 extends linearly across the muffler housing 102 from the inlet header 106 to the outlet header 108 (i.e., the primary muffler conduit 113 is a straight tube or pipe). The primary muffler conduit 113 has a primary conduit wall 117 that is tubular in shape and includes a first set of perforations 118. The primary conduit wall 117 extends linearly between an upstream primary conduit end 119 and a downstream primary conduit end 121. The inlet header 106 includes a primary inlet aperture 123 that receives the upstream primary conduit end 119 in a close tolerance fit and the outlet header 108 includes a single outlet aperture 125 that receives the downstream primary conduit end 121 in a close tolerance fit. A downstream end of the primary inlet pipe 103 is received in the primary inlet aperture 123 and the upstream primary conduit end 119 in a close tolerance fit to form an overlapping junction. An upstream end of the single outlet pipe 107 is received in the single outlet aperture 125 and the downstream primary conduit end 121 in a close tolerance fit to form an overlapping junction. Thus, the primary muffler conduit 113 is arranged in fluid communication with and carries exhaust between the primary inlet pipe 103 and the single outlet pipe 107 and therefore defines a primary exhaust flow path 127 through the muffler 101.

The secondary muffler conduit 115 has a secondary conduit wall 129 that is tubular in shape and includes a second set of perforations 131. The secondary conduit wall 129 is bent and extends between an upstream secondary conduit end 133 and a downstream secondary conduit end 135. The inlet header 106 includes a secondary inlet aperture 137 that receives the upstream secondary conduit end 133 in a close tolerance fit. A downstream end of the secondary inlet pipe 105 is received in the secondary inlet aperture 137 and the upstream secondary conduit end 133 in a close tolerance fit to form an overlapping junction. Thus, the secondary muffler conduit 115 defines a secondary exhaust flow path 138 through the muffler 101.

The muffler 101 also includes a primary resonator 139 and a secondary resonator 141 positioned inside the muffler housing 102. The primary resonator 139 is formed by a first pinch can 143 that is positioned inside the muffler housing 102. More specifically, the first pinch can 143 is positioned over the primary muffler conduit 113. The first pinch can 143 has a first pinch can wall 145 that is tubular in shape and that extends linearly between an upstream first pinch can end 147 and a downstream first pinch can end 149. As such, a primary resonator chamber 151 is formed by the space between the primary conduit wall 117 and the first pinch can wall 145. The secondary resonator 141 includes a secondary resonator chamber 153 that is formed by the space between the first pinch can 143 and the muffler housing 102. The first set of perforations 118 in the primary conduit wall 117 are arranged in fluid communication with the primary resonator chamber 151 and are designed to let sound propagate from the primary muffler conduit 113 into the primary resonator chamber 151. The second set of perforations 131 in the secondary conduit wall 129 are arranged in fluid communication with the secondary resonator chamber 153 and are designed to let sound propagate from the secondary muffler conduit 115 into the secondary resonator chamber 153. The primary resonator chamber 151 and/or the secondary resonator chamber 153 may, but need not, contain a sound dampening material 155. By way of example and without limitation, the sound dampening material 155 may be fiberglass roving, which is designed to absorb and attenuate sound within certain frequency ranges. Thus, it should be appreciated that the primary and secondary resonator chambers 151, 153 in the muffler 101 only function to attenuate sound and do not themselves define any exhaust flow paths within the muffler 101. In other words, the primary and secondary resonator chambers 151, 153 act as trapped volumes within the muffler 101 and are not designed with an inlet and outlet for exhaust flow. Optionally, one or more baffles 157 may be positioned within the secondary resonator chamber 153 to tune resonant frequency ranges within the secondary resonator chamber 153.

The primary resonator 139 has a primary resonator cross-sectional area A1, as defined by the first pinch can 143, and the primary muffler conduit 113 has a primary muffler conduit cross-sectional area a1 that is smaller than the primary resonator cross-sectional area A1. The secondary resonator 141 has a secondary resonator cross-sectional area A2, as defined by the outer shell 104 of the muffler housing 102, and the secondary muffler conduit 115 has a secondary muffler conduit cross-sectional area a2 that is smaller than the secondary resonator cross-sectional area A2. It should be appreciated that the primary resonator cross-sectional area A1 and the primary muffler conduit cross-sectional area a1 are substantially perpendicular to exhaust flow through/along the primary exhaust flow path 127 and the secondary resonator cross-sectional area A2 and the secondary muffler conduit cross-sectional area a2 are substantially perpendicular to exhaust flow through/along the secondary exhaust flow path 138. The primary and secondary resonators 139, 141 and the primary and secondary muffler conduits 113, 115 are sized such that a primary area ratio A1/a1 of the primary resonator cross-sectional area A1 divided by the primary muffler conduit cross-sectional area a1 is smaller than a second area ratio A2/a2 of the secondary resonator cross-sectional area A2 divided by the secondary muffler conduit cross-sectional area a2. For example, the primary resonator 139 (as defined by the first pinch can 143) and the primary muffler conduit 113 are sized such that the primary area ratio A1/a1 of the primary resonator cross-sectional area A1 divided by the primary muffler conduit cross-sectional area a1 may be greater than 1 and less than 4. The secondary resonator 141 (as defined by the outer shell 104 of the muffler housing 102) and the secondary muffler conduit 115 are sized such that the second area ratio A2/a2 of the secondary resonator cross-sectional area A2 divided by the secondary muffler conduit cross-sectional area a2 may be greater than 4 and less than 100. This particular geometry enables the second (quieter) operating mode of the muffler 101 to reduce the sound level produced by the vehicle exhaust system 10 at any given engine speed (rpms) without having a substantial impact on the exhaust note (i.e., the frequency, pitch, resonance, burble, etc.). As a result, the acoustic characteristics of the exhaust note remain the same in the first and second operating modes, the exhaust sound is just quieter (i.e., is at lower decibel levels) in the second operating mode.

Figure 3:
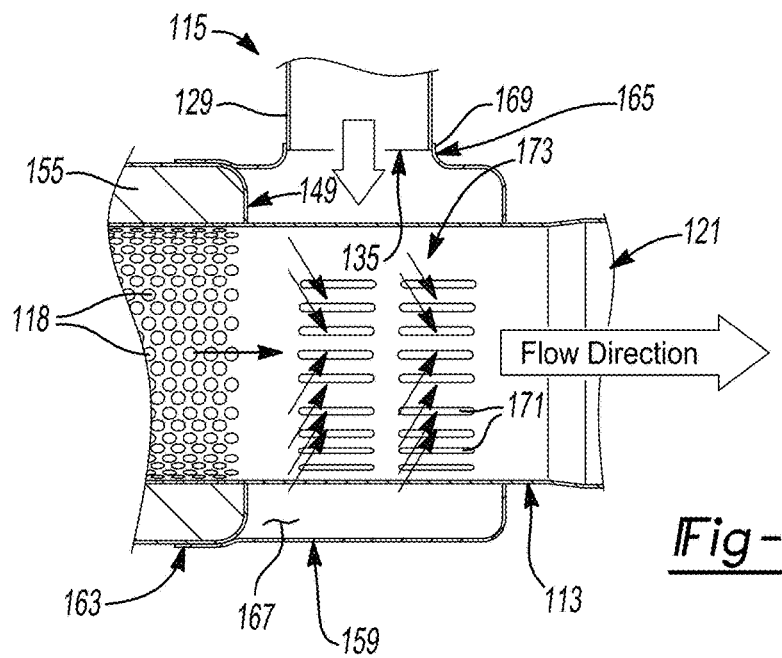
FIG. 3 is a partial top cross-sectional view of the exemplary muffler assembly illustrated in FIG. 2.

With additional reference to FIG. 3, the secondary muffler conduit 115 is connected in fluid communication with the primary muffler conduit 113 by a second pinch can 159 that is positioned inside the muffler housing 102. The second pinch can 159 includes a second pinch can wall 161 that extends between an upstream second pinch can end 163 and a downstream second pinch can end 165. The second pinch can 159 is positioned over the primary muffler conduit 113 and the upstream second pinch can end 163 abuts the downstream first pinch can end 149 in an overlapping close tolerance slip fit such that a diffusion chamber 167 is formed between the primary conduit wall 117 and the second pinch can wall 161. The second pinch can wall 161 includes a pinch can inlet 169 that receives the downstream secondary conduit end 135 in a close tolerance fit to form an overlapping junction.

The primary muffler conduit 113 includes circumferentially spaced openings 171 in the primary conduit wall 117 that permit exhaust flow passing through the secondary muffler conduit 115 and the diffusion chamber 167 in the second pinch can 159 to enter the primary muffler conduit 113 with reduced turbulence and flow noise. The circumferentially spaced openings 171 in the primary conduit wall 117 are positioned along a limited arc-length, leaving an unperforated region 173 in the primary conduit wall 117 that is aligned with the pinch can inlet 169 of the second pinch can 159. As the exhaust flow exits the downstream secondary conduit end 135 and enters the diffusion chamber 167 in the second pinch can 159, the unperforated region 173 of the primary conduit wall 117 prevents the exhaust flow from immediately entering the primary muffler conduit 113 and forces the exhaust flow in the diffusion chamber 167 to spread out around a circumference of the primary conduit wall 117 before entering the primary muffler conduit 113. As a result, exhaust in the diffusion chamber 167 of the second pinch can 159 flows radially inwardly through the circumferentially spaced openings 171 in the primary conduit wall 117 as the exhaust gases enter the primary muffler conduit 113. This arrangement further reduces turbulence and flow noise.

Figure 4:
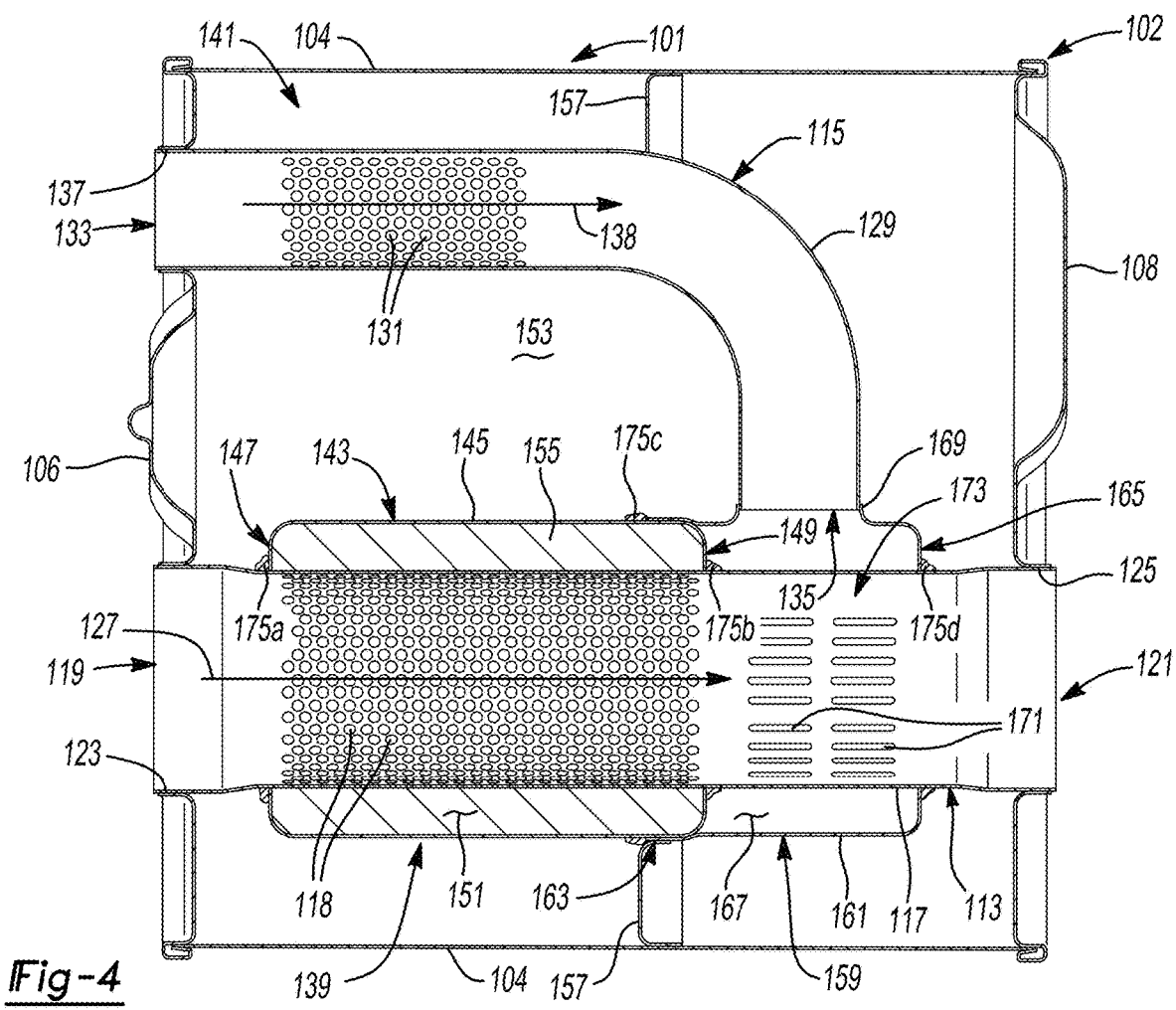
FIG. 4 is another top cross-sectional view of the exemplary muffler assembly illustrated in FIG. 2 where several weld joints in the muffler assembly are shown.
Figure 4A:
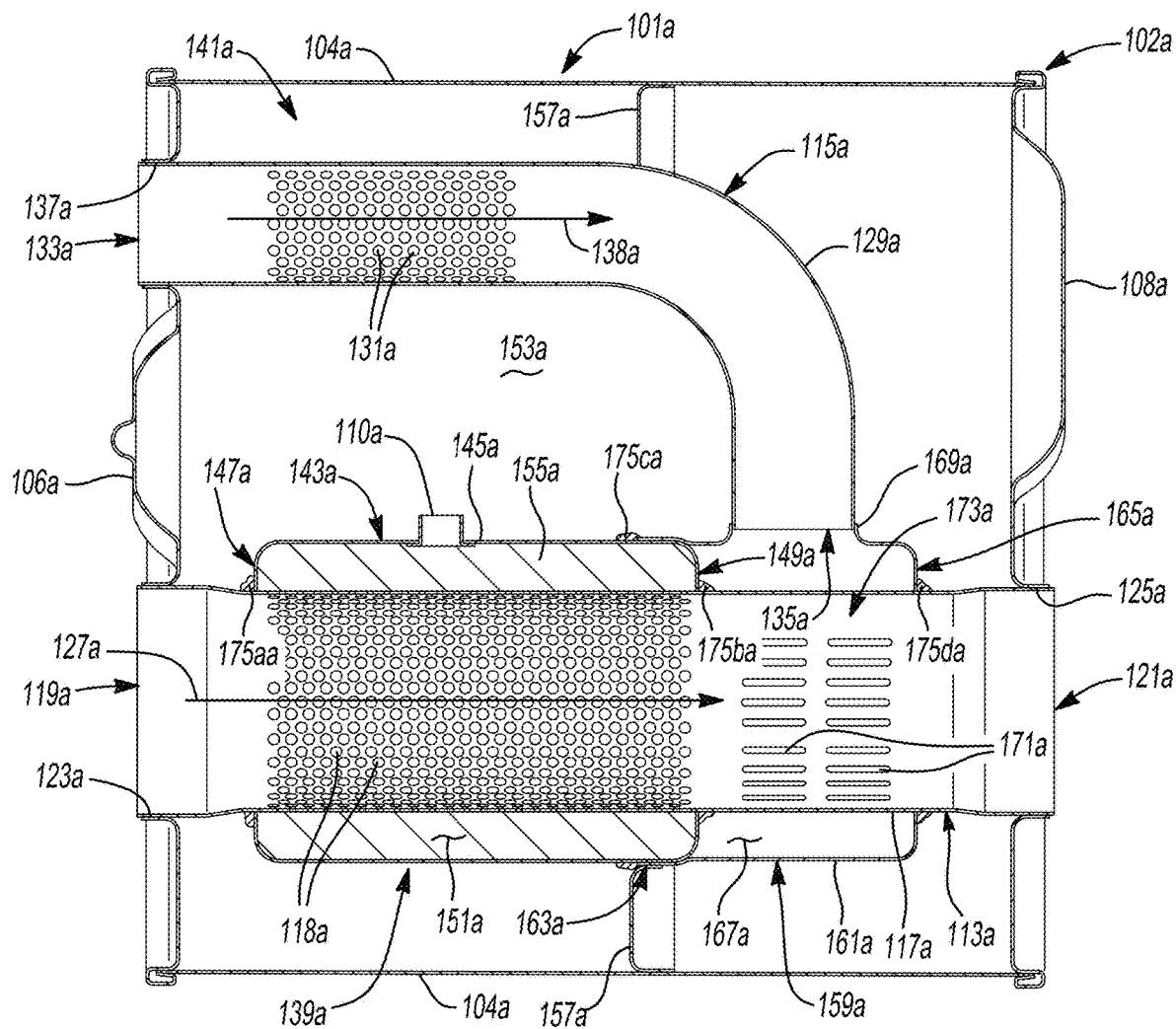
FIG. 4A is a top cross-sectional view of alternate muffler assembly including a connector.

As depicted FIG. 4A, an alternate muffler 101a is depicted. Muffler 101a is substantially similar to muffler 101. Accordingly, similar elements will be identified with like reference numerals including an "a" suffix. The primary, and possibly the only, difference between muffler 101a and muffler 101 relates to a connector 110a that functions as a conduit interconnecting primary resonator chamber 151a with secondary resonator 153a. It is contemplated that muffler 101a may include a plurality of connectors 110a extending through pinch can wall 145a at spaced apart locations. Alternatively, connector 110a may simply be defined as an aperture extending through first pinch can 143a without an additional cylindrical tube being present.

Figure 4B:
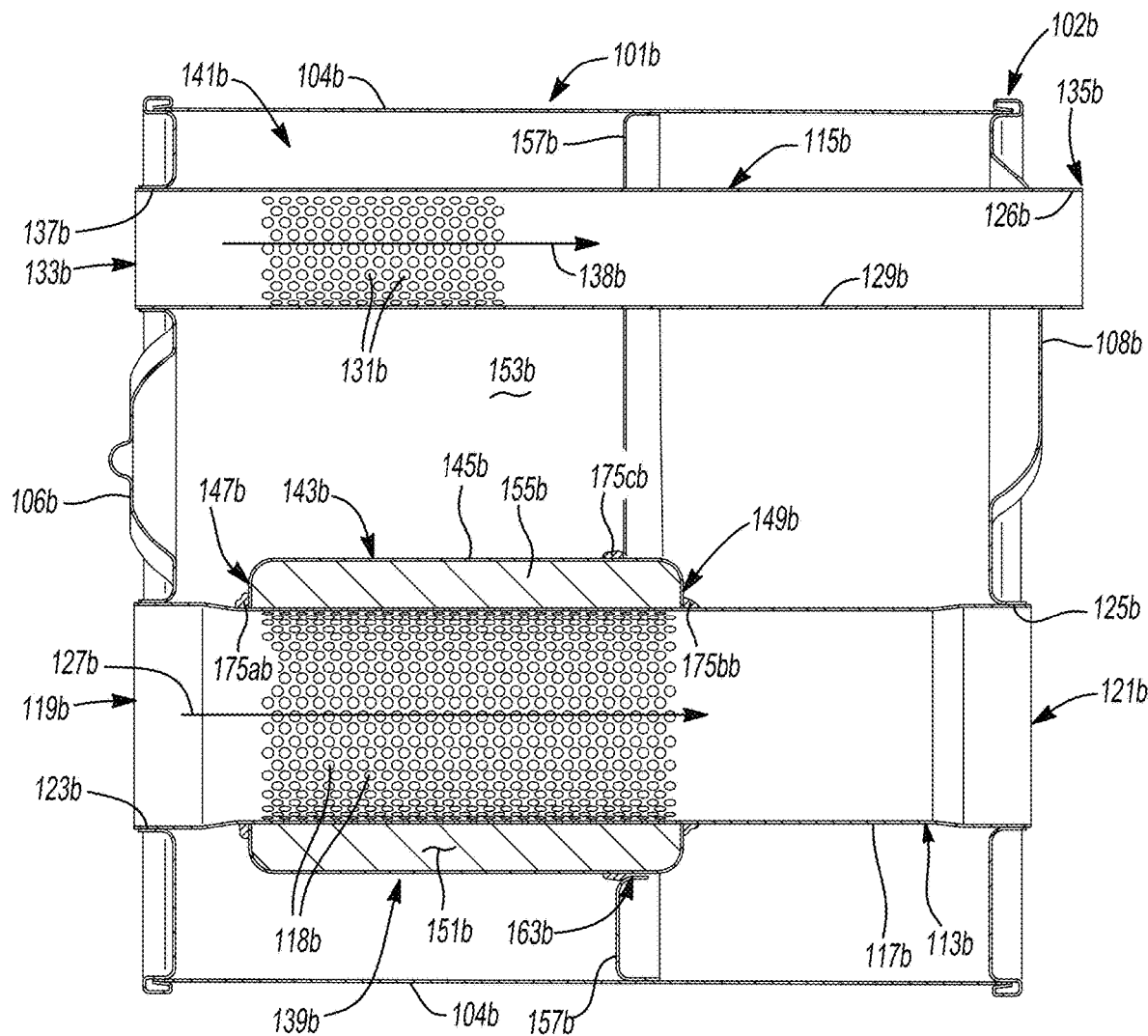
FIG. 4B is a top cross-sectional view of another alternate muffler assembly.

Another alternate muffler 101b is depicted in FIG. 4B. Muffler 101b is substantially similar to muffler 101. As such, similar elements will be identified with like reference numerals including an "b" suffix. A primary difference between muffler 101b and muffler 101 is the provision of a secondary outlet aperture 126b at secondary conduit end 135b of secondary muffler conduit 115b. It should be appreciated that secondary conduit wall 129b no longer turns toward second pinch can 159a. Secondary muffler conduit 115a does not meet or become in fluid communication with pinch can inlet 169 (FIG. 4). On the contrary, secondary muffler conduit 115b may be shaped as a right circular hollow cylinder extending along a straight line as depicted in FIG. 4B.

The previously termed single outlet aperture 125 in relation to muffler 101 is now identified as primary outlet aperture 125b. In this arrangement, exhaust flow path 127b is not connected to exhaust flow path 138b downstream of the attenuating volumes.

Returning to FIGS. 1-4, the first and second pinch cans 143, 159 may be secured to the primary muffler conduit 113 in a number of different ways. For example and without limitation, the first and second pinch cans 143, 159 may be welded to the primary muffler conduit 113 at the weld joints 175a-d shown in FIG. 4. In accordance with this example, the upstream first pinch can end 147 may be welded to the primary conduit wall 117 at weld joint 175a. Similarly, the downstream first pinch can end 149 may be welded to the primary conduit wall 117 at weld joint 175b. The upstream second pinch can end 163 is configured to slide over the downstream first pinch can end 149 in an overlapping close tolerance slip fit and be secured to the first pinch can wall 145 by weld joint 175c. The upstream second pinch can end 163 can be spot welded to the downstream first pinch can end 149 to form one or more localized weld joints 175c that are circumferentially spaced about first pinch can wall 145 since the overlapping fit between the upstream second pinch can end 163 and the downstream first pinch can end 149 provides sealing (i.e., weld joint(s) 175c do not have to provide sealing). Finally, the downstream second pinch can end 165 may be welded to the primary conduit wall 117 at weld joint 175d. While many different welding operations may be utilized, by way of example and without limitation, weld joints 175a, 175b, and 175c may be created by stich welding, spot welding, or spinning operations. Alternatively, weld joints 175a, 175b, and 175c could be replaced by ridge lock connections.

With reference to FIG. 5, a method of assembling the muffler 101 described above is illustrated. The method includes step 1A of assembling the primary resonator 139 by positioning the first pinch can 143 over the primary muffler conduit 113 and step 2A of securing the upstream and downstream first pinch can ends 147, 149 to the primary conduit wall 117 by creating weld joints 175a and 175b. The method then proceeds with step 3A of positioning/sliding the second pinch can 159 over the primary muffler conduit 113 until the upstream second pinch can end 163 receives the downstream first pinch can end 149 in a slip fit and an abutting arrangement to form the diffusion chamber 167 between the primary muffler conduit 113 and the second pinch can 159, which is arranged in fluid communication with the primary muffler conduit 113 through the circumferentially spaced openings 171 in the primary conduit wall 117.

Thus, in accordance with the method shown in FIG. 5, step 3A of positioning the second pinch can 159 over the primary muffler conduit 113 until the upstream second pinch can end 163 abuts the downstream first pinch can end 149 is performed after steps 1A and 2A of assembling the primary resonator 139 by positioning the first pinch can 143 over the primary muffler conduit 113 and securing the upstream and downstream first pinch can ends 147, 149 to the primary conduit wall 117. The method shown in FIG. 5 proceeds with step 4A of securing the upstream second pinch can end 163 to the first pinch can wall 145 by creating weld joint 175c and securing the downstream second pinch can end 165 to the primary conduit wall 117 by creating weld joint 175d.

The method shown in FIG. 5 also includes step 5A of connecting the downstream secondary conduit end 135 to the pinch can inlet 169 on the second pinch can 159 to form a junction between the primary and secondary muffler conduits 113, 115 inside the muffler housing 102. The method further includes step 6A of connecting the upstream primary conduit end 119 to the primary inlet aperture 123 in the inlet header 106, step 7A of connecting the upstream secondary conduit end 133 to the secondary inlet aperture 137 in the inlet header 106, step 8A of installing the primary and secondary muffler conduits 113, 115 and the first and second pinch cans 143, 159 inside the outer shell 104 of the muffler housing 102, which forms the secondary resonator 141 inside the muffler housing 102, and step 9A of connecting the downstream primary conduit end 121 to the single outlet aperture 125 in the outlet header 108. It should be appreciated that steps 5A-9A may be performed in a different order than that described above and illustrated in FIG. 5 and that one or more of steps 5A-9A may be performed before one or more of steps 1A-4A.

With reference to FIG. 6, an alternative method of assembling the muffler 101 described above is illustrated. This alternative method includes step 1B of positioning/sliding the downstream first pinch can end 149 into the upstream second pinch can end 163 in a slip fit to form an abutting arrangement between the first and second pinch cans 143, 159 and step 2B of securing the downstream first pinch can end 149 to the upstream second pinch can end 163 by creating weld point 175c. The method proceeds with step 3B positioning/sliding the first and second pinch cans 143, 159 over the primary muffler conduit 113 to form the primary resonator 139 and the diffusion chamber 167 between the primary muffler conduit 113 and the second pinch can 159, which is arranged in fluid communication with the primary muffler conduit 113 through the circumferentially spaced openings 171 in the primary conduit wall 117.

Thus, in accordance with the method shown in FIG. 6, step 1B of positioning/sliding the downstream first pinch can end 149 into the upstream second pinch can end 163 in a slip fit to form an abutting arrangement between the first and second pinch cans 143, 159 and step 2B of securing the downstream first pinch can end 149 to the upstream second pinch can end 163 are performed before step 3B of positioning/sliding the first and second pinch cans 143, 159 over the primary muffler conduit 113 to form the primary resonator 139 and the diffusion chamber 167. The method shown in FIG. 6 then proceeds with step 4B of securing the upstream and downstream first pinch can ends 147, 149 and the downstream second pinch can end 165 to the primary conduit wall 117 by creating weld joints 175a, 175b, and 175d.

The method shown in FIG. 6 also includes step 5B of connecting the downstream secondary conduit end 135 to the pinch can inlet 169 on the second pinch can 159 to form a junction between the primary and secondary muffler conduits 113, 115 inside the muffler housing 102. The method further includes step 6B of connecting the upstream primary conduit end 119 to the primary inlet aperture 123 in the inlet header 106, step 7B of connecting the upstream secondary conduit end 133 to the secondary inlet aperture 137 in the inlet header 106, step 8B of installing the primary and secondary muffler conduits 113, 115 and the first and second pinch cans 143, 159 inside the outer shell 104 of the muffler housing 102, which forms the secondary resonator 141 inside the muffler housing 102, and step 9B of connecting the downstream primary conduit end 121 to the single outlet aperture 125 in the outlet header 108. It should be appreciated that steps 5B-9B may be performed in a different order than that described above and illustrated in FIG. 6 and that one or more of steps 5B-9B may be performed before one or more of steps 1B-4B.

Figure 7:
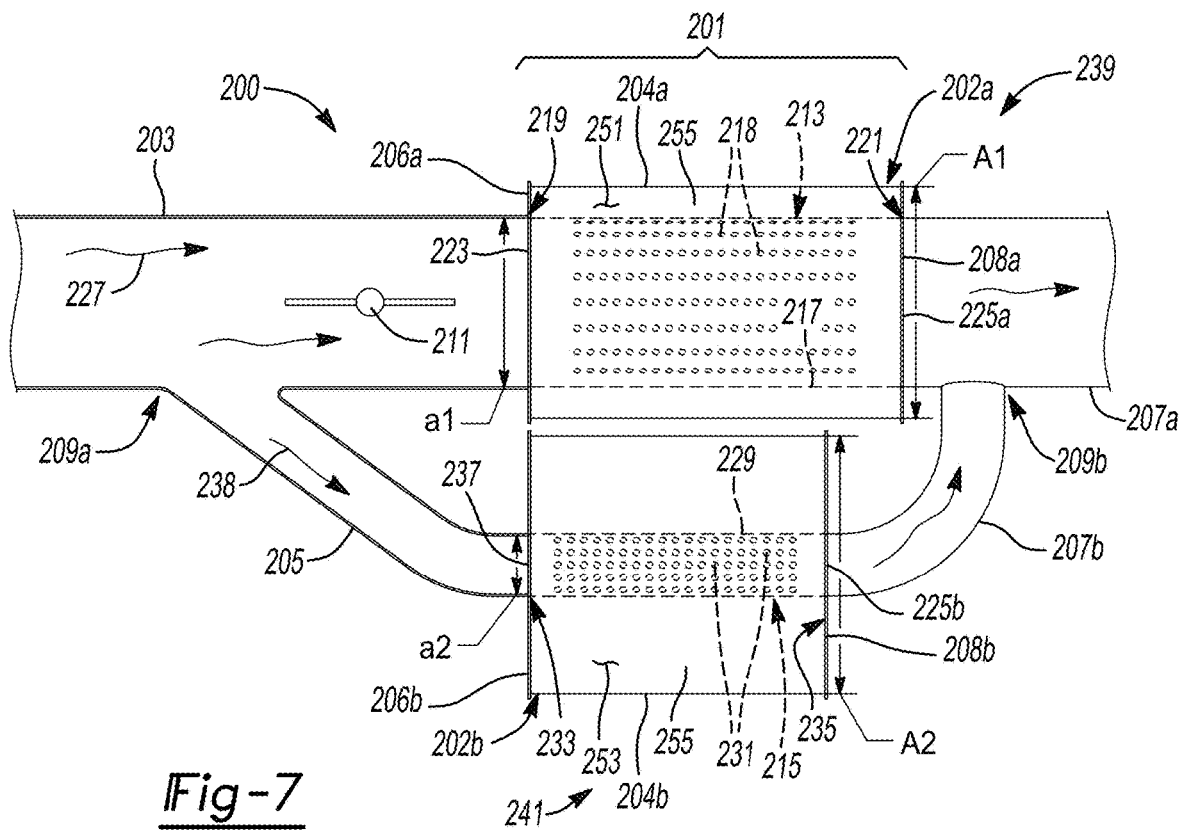
FIG. 7 is a top cross-sectional view of another exemplary muffler assembly with an active valve shown in an open position such that exhaust flow through the muffler assembly passes through a primary muffler conduit and a secondary muffler conduit and provides a first operating mode with a louder exhaust sound.
Figure 8:
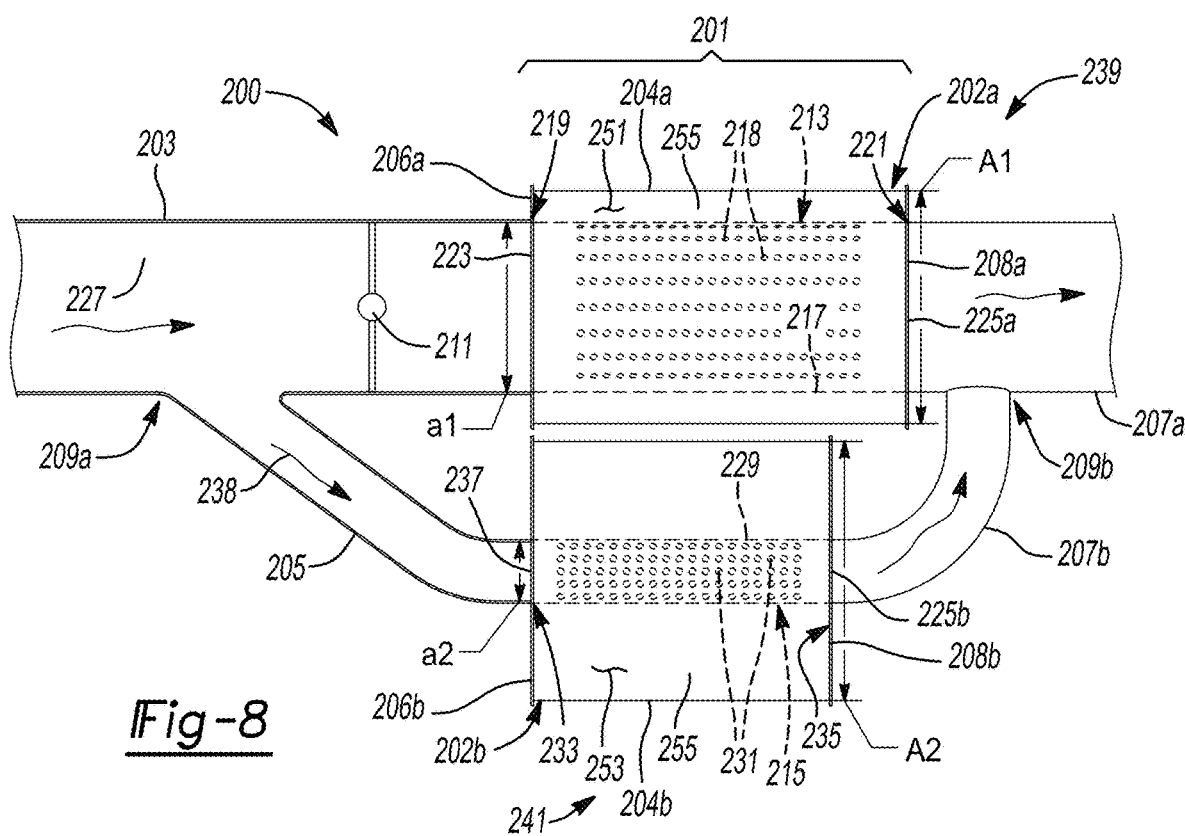
FIG. 8 is a top cross-sectional view of the exemplary muffler assembly illustrated in FIG. 7 where the active valve is shown in a closed position such that the exhaust flow through the muffler assembly passes through the secondary muffler conduit and provides a second operating mode with a quieter exhaust sound.

With reference to FIGS. 7 and 8, another muffler assembly 200 for the vehicle exhaust system 10 shown in FIG. 1 is illustrated. The muffler assembly 200 shown in FIGS. 7 and 8 shares many of the same components as the muffler assembly 100 illustrated in FIGS. 1-4, but in FIGS. 7 and 8 the primary resonator 239 and the secondary resonator 241 of the muffler 201 are separate components that are spaced apart by a small gap. Rather than repeat the description set forth above, the following paragraphs describe the structure and function of the components in FIGS. 7 and 8 that are new and/or different from those shown and described in connection with FIGS. 1-4. It should be appreciated that the reference numbers in FIGS. 1-4 are "100" series numbers (e.g., 100, 102, 104, etc.) whereas the components in FIGS. 7 and 8 that are the same or similar to the components of the muffler assembly 100 shown in FIGS. 1-4 share the same base reference numbers, but are listed as "200" series numbers (e.g., 200, 202, 204, etc.). Thus, the same description for element 100 above applies to element 200 in FIGS. 7 and 8 and so on and so forth.

The muffler assembly 200 includes a muffler 201 comprising a primary resonator 239 with a primary resonator chamber 251 and a secondary resonator 241 with a secondary resonator chamber 253. A primary muffler conduit 213 passes through the primary resonator chamber 251 to define a primary exhaust flow path 227 through the muffler 201. A secondary muffler conduit 215 passes through the secondary resonator chamber 253 to define a secondary exhaust flow path 238 through the muffler 201. The primary resonator 239 includes a primary resonator housing 202a and the secondary resonator 241 includes a secondary resonator housing 202b that is separate and spaced apart from the primary resonator housing 202a. Each of the primary and secondary resonator housings 202a, 202b has an outer shell 204a, 294b that has a substantially circular cross-sectional shape and is closed at inlet and outlet ends by a primary or secondary inlet header 206a, 206b and a primary or secondary outlet header 208a, 208b, respectively.

The muffler assembly 200 also includes a primary inlet pipe 203 that is connected to the primary inlet header 206a, a secondary inlet pipe 205 that is connected to the secondary inlet header 206b, a primary outlet pipe 207a that is connected to the primary outlet header 208a, and a secondary outlet pipe 207b that is connected to the secondary outlet header 208b. The primary inlet pipe 203 has a larger diameter than the secondary inlet pipe 205 and the primary outlet pipe 207a has a larger diameter than the secondary outlet pipe 207b. The primary and secondary inlet pipes 203, 205 are connected at a first junction 209a that is external to and upstream of the muffler 201, which places the primary and secondary inlet pipes 203, 205 in fluid communication with one another. The primary and secondary outlet pipes 207a, 207b are connected at a second junction 209b that is external to and downstream of the muffler 201, which places the primary and secondary outlet pipes 207a, 207b in fluid communication with one another.

An active, electromechanical valve 211 is positioned in the primary inlet pipe 203 and is actuatable between an open position (as shown in FIG. 7), where exhaust flow through the primary inlet pipe 203 is permitted, and a closed position (as shown in FIG. 8), where the active, electromechanical valve 211 obstructs and therefore restricts exhaust flow through the primary inlet pipe 203. As shown in FIG. 7, the open position of the active, electromechanical valve 211 provides a first operating mode where exhaust flows into the muffler 201 through both the primary and secondary inlet pipes 203, 205 and where the sound attenuation provided by the muffler 201 is minimal to produce a loud exhaust sound. As shown in FIG. 8, the closed position of the active, electromechanical valve 211 provides a second operating mode where all or a majority (i.e., more than 50 percent) of exhaust flow into the muffler 201 is through the secondary inlet pipe 205, which results in greater sound attenuation by the muffler 201 compared to the first operating mode and a quieter exhaust sound that still maintains the same exhaust note, but at lower decibel levels (dBs).

Still referring to FIGS. 7 and 8, the primary muffler conduit 213 extends linearly across the primary resonator housing 202a from the primary inlet header 206a to the primary outlet header 208a (i.e., the primary muffler conduit 213 is a straight tube or pipe). The primary muffler conduit 213 has a primary conduit wall 217 that is tubular in shape and includes a first set of perforations 218. The primary conduit wall 217 extends linearly between an upstream primary conduit end 219 and a downstream primary conduit end 221. The primary inlet header 206a includes a primary inlet aperture 223 that receives the upstream primary conduit end 219 in a close tolerance fit and the primary outlet header 208a includes a primary outlet aperture 225a that receives the downstream primary conduit end 221 in a close tolerance fit. A downstream end of the primary inlet pipe 203 is received in the primary inlet aperture 223 and the upstream primary conduit end 219 in a close tolerance fit to form an overlapping junction. An upstream end of the primary outlet pipe 207a is received in the primary outlet aperture 225a and the downstream primary conduit end 221 in a close tolerance fit to form an overlapping junction. Thus, the primary muffler conduit 213 is arranged in fluid communication with and carries exhaust between the primary inlet pipe 203 and the primary outlet pipe 207a to define the primary exhaust flow path 227 through the muffler 201.

The secondary muffler conduit 215 has a secondary conduit wall 229 that is tubular in shape and includes a second set of perforations 231. The secondary conduit wall 229 extends linearly between an upstream secondary conduit end 233 and a downstream secondary conduit end 235 (i.e., the secondary muffler conduit 215 is a straight tube or pipe). The secondary inlet header 206b includes a secondary inlet aperture 237 that receives the upstream secondary conduit end 233 in a close tolerance fit. A downstream end of the secondary inlet pipe 205 is received in the secondary inlet aperture 237 and the upstream secondary conduit end 233 in a close tolerance fit to form an overlapping junction. The secondary outlet header 208b includes a secondary outlet aperture 225b that receives the downstream secondary conduit end 235 in a close tolerance fit. An upstream end of the secondary outlet pipe 207b is received in the secondary outlet aperture 225b and the downstream secondary conduit end 235 in a close tolerance fit to form an overlapping junction. Thus, the secondary muffler conduit 215 is arranged in fluid communication with and carries exhaust between the secondary inlet pipe 205 and the secondary outlet pipe 207b to define the secondary exhaust flow path 238 through the muffler 201.

The first set of perforations 218 in the primary conduit wall 217 are arranged in fluid communication with the primary resonator chamber 251 and are designed to let sound propagate from the primary muffler conduit 213 into the primary resonator chamber 251. The second set of perforations 231 in the secondary conduit wall 229 are arranged in fluid communication with the secondary resonator chamber 253 and are designed to let sound propagate from the secondary muffler conduit 215 into the secondary resonator chamber 253. The primary resonator chamber 251 and/or the secondary resonator chamber 253 may contain a sound dampening material 255, such as fiberglass roving.

The primary resonator 239 has a primary resonator cross-sectional area A1, as defined by the outer shell 204a of the primary resonator housing 202a, and the primary muffler conduit 213 has a primary muffler conduit cross-sectional area a1 that is smaller than the primary resonator cross-sectional area A1. The secondary resonator 241 has a secondary resonator cross-sectional area A2, as defined by the outer shell 204b of the secondary resonator housing 202b, and the secondary muffler conduit 215 has a secondary muffler conduit cross-sectional area a2 that is smaller than the secondary resonator cross-sectional area A2. It should be appreciated that the primary resonator cross-sectional area A1 and the primary muffler conduit cross-sectional area a1 are substantially perpendicular to exhaust flow through/along the primary exhaust flow path 227 and the secondary resonator cross-sectional area A2 and the secondary muffler conduit cross-sectional area a2 are substantially perpendicular to exhaust flow through/along the secondary exhaust flow path 238. The primary and secondary resonators 239, 241 and the primary and secondary muffler conduits 213, 215 are sized such that a primary area ratio A1/a1 of the primary resonator cross-sectional area A1 divided by the primary muffler conduit cross-sectional area a1 is smaller than a second area ratio A2/a2 of the secondary resonator cross-sectional area A2 divided by the secondary muffler conduit cross-sectional area a2. For example, the primary resonator 239 and the primary muffler conduit 213 are sized such that the primary area ratio A1/a1 of the primary resonator cross-sectional area A1 divided by the primary muffler conduit cross-sectional area a1 may be greater than 1 and less than 4. The secondary resonator 241 and the secondary muffler conduit 215 are sized such that the second area ratio A2/a2 of the secondary resonator cross-sectional area A2 divided by the secondary muffler conduit cross-sectional area a2 may be greater than 4 and less than 100. This particular geometry enables the second (quieter) operating mode of the muffler 201 to reduce the sound level produced by the vehicle exhaust system 10 at any given engine speed (rpms) without having a substantial impact on the exhaust note (i.e., the frequency, pitch, resonance, burble, etc.). As a result, the acoustic characteristics of the exhaust note remain the same in the first and second operating modes, the exhaust sound is just quieter (i.e., is at lower decibel levels) in the second operating mode.

Figure 7A:
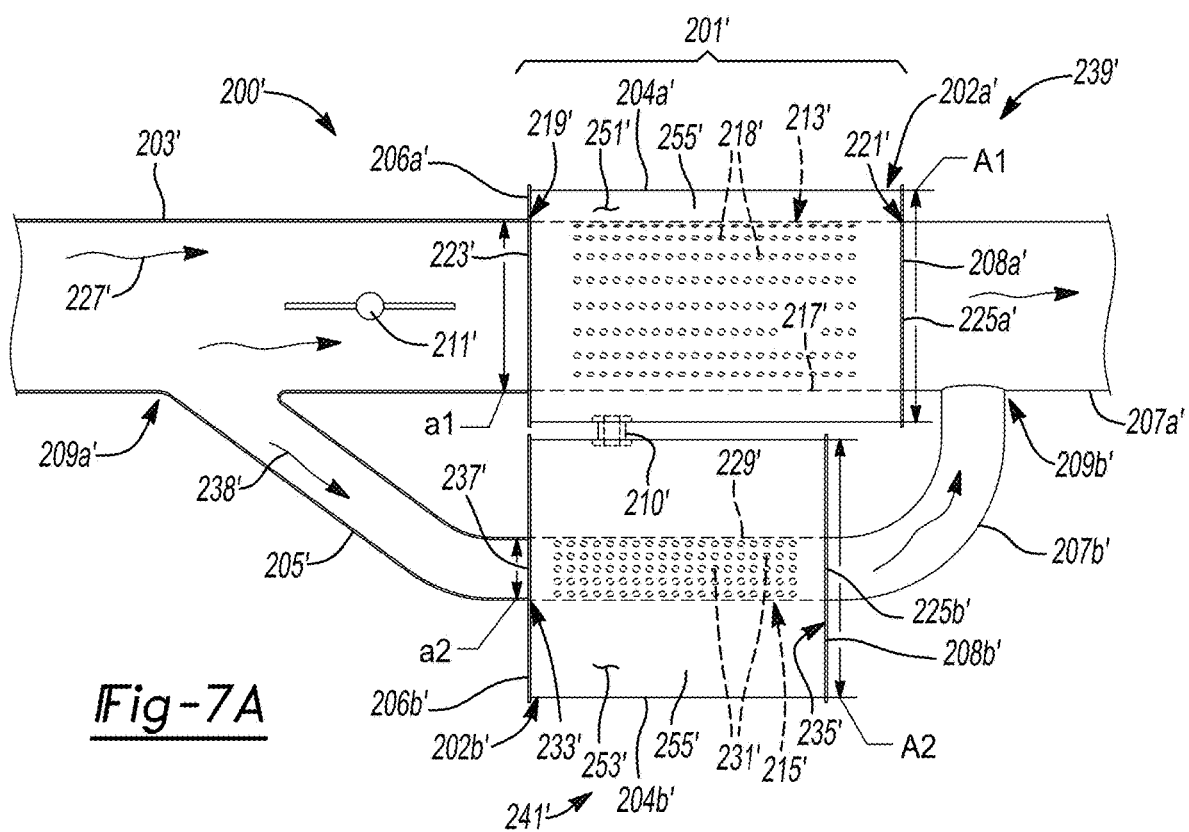
FIG. 7A is a top cross-sectional view of another exemplary muffler assembly including a connector.

Another alternate is depicted at FIG. 7A and identified at reference numeral 201'. Muffler 201' is substantially similar to muffler 201. Accordingly, similar elements will be identified with like reference numerals including a prime suffix. Muffler 201' differs from muffler 201 primarily in that a connector 210' is provided to allow fluid communication between primary resonator chamber 251' and secondary resonator chamber 253'. It is contemplated that connector 210' is a hollow tube extending through each of outer shell 204a' and outer shell 204b'. Additional connectors 210' may also be optionally provided to fluidly interconnect primary resonator chamber 251' with secondary resonator chamber 253'.

Figure 7B:
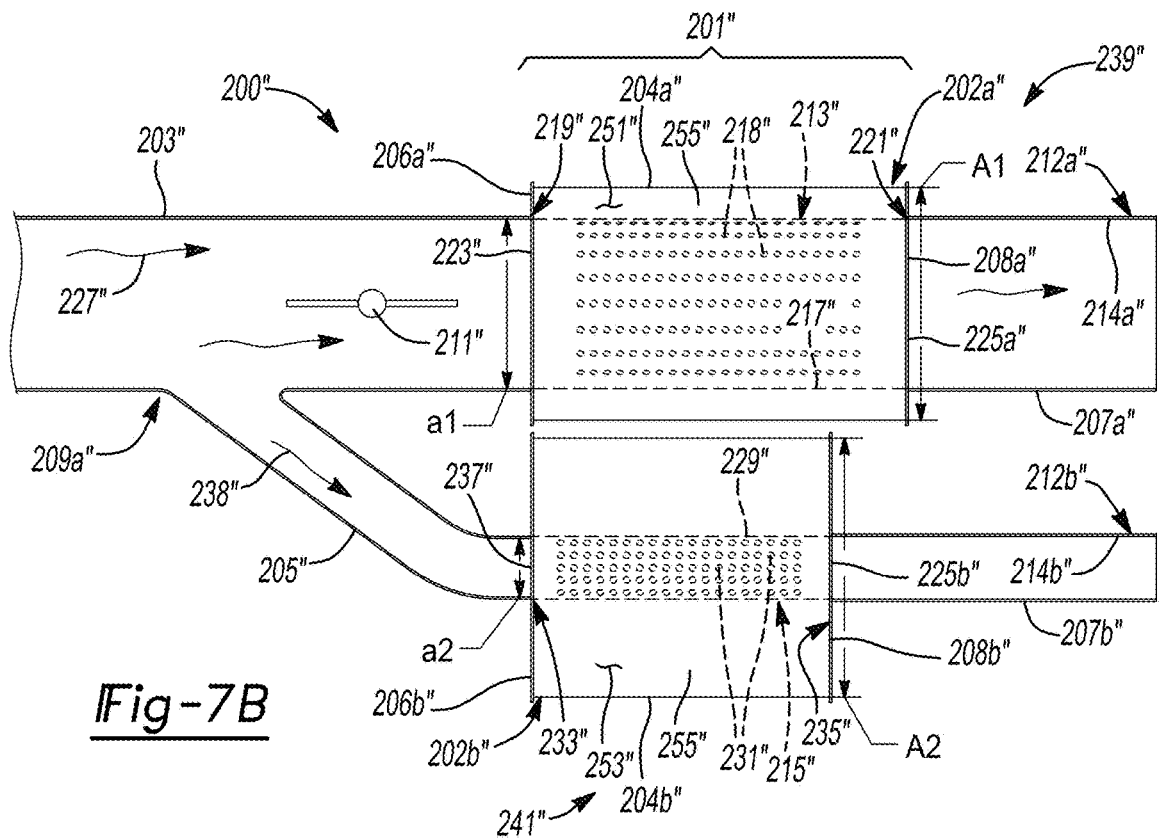
FIG. 7B is a top cross-sectional view of another alternate muffler assembly.

FIG. 7B depicts another alternate muffler identified at reference numeral 201". Muffler 201" is substantially similar to muffler 201 such that similar elements will be identified with like numerals including a double prime suffix. The primary difference between muffler 201 and muffler 201" lies in the removal of first junction 209b as shown in FIG. 7. In the alternate muffler 201" secondary outlet pipe 207b" does not turn toward primary outlet pipe 207a" but instead continues straight and remains spaced apart from primary outlet pipe 207a". A distal end 212a" of primary outlet pipe 207a" defines a primary outlet pipe aperture 214a". A distal end 212b" of secondary outlet pipe 207b" defines a secondary outlet pipe aperture 214b". In similar fashion to muffler 101b shown in FIG. 4B, exhaust flow path 227" and exhaust flow path 238" remain separate from one another with no physical interconnection between the exhaust flow paths downstream from the attenuating volumes.

Many modifications and variations of the present invention are possible in light of the above teachings and may be practiced otherwise than as specifically described while within the scope of the appended claims. These antecedent recitations should be interpreted to cover any combination in which the inventive novelty exercises its utility. With respect to the methods set forth herein, the order of the steps may depart from the order in which they appear without departing from the scope of the present disclosure and the appended method claims. Additionally, various steps of the method may be performed sequentially or simultaneously in time.

What is claimed is:

1. A muffler assembly for a vehicle exhaust system, comprising:
    a muffler including a primary resonator with a primary resonator chamber and a secondary resonator with a secondary resonator chamber;
    a primary muffler conduit that passes through the primary resonator chamber to define a primary exhaust flow path through the muffler;
    a secondary muffler conduit extending through at least part of the secondary resonator chamber to define a secondary exhaust flow path within the muffler, wherein an end of the secondary muffler conduit intersects and is in fluid communication with the primary muffler conduit at a location downstream from the primary resonator chamber; and
    a valve positioned upstream of the primary resonator that is actuatable between an open position and a closed position,
    wherein exhaust flow through both the primary muffler conduit and primary exhaust flow path and through the secondary muffler conduit and secondary exhaust flow path is permitted when the valve is in the open position to produce a first level of sound attenuation provided by the muffler in a first operating mode,
    wherein the valve is configured to restrict exhaust flow through the primary muffler conduit and primary exhaust flow path in the closed position such that more than 50 percent of the exhaust flow is directed through the secondary muffler conduit and secondary exhaust flow path when the valve is in the closed position to produce a second level of sound attenuation provided by the muffler in a second operating mode that is greater than the first level of sound attenuation provided by the muffler in the first operating mode,
    wherein the primary resonator has a primary resonator cross-sectional area (A1) and the primary muffler conduit has a primary muffler conduit cross-sectional area (a1) that is smaller than the primary resonator cross-sectional area (A1),
    wherein the secondary resonator has a secondary resonator cross-sectional area (A2) and the secondary muffler conduit has a secondary muffler conduit cross-sectional area (a2) that is smaller than the secondary resonator cross-sectional area (A2),
    wherein the primary and secondary resonators and the primary and secondary muffler conduits are sized such that a primary area ratio (A1/a1) of the primary resonator cross-sectional area (A1) divided by the primary muffler conduit cross-sectional area (a1) is smaller than a second area ratio (A2/a2) of the secondary resonator cross-sectional area (A2) divided by the secondary muffler conduit cross-sectional area (a2).

2. The muffler assembly as set forth in claim 1, further comprising:
    a primary inlet pipe arranged in fluid communication with the primary muffler conduit; and
    a secondary inlet pipe that is arranged in fluid communication with the secondary muffler conduit and is connected to the primary inlet pipe at a first junction that is external to the muffler.

3. The muffler assembly as set forth in claim 1, wherein the muffler includes a connector placing the primary resonator chamber in fluid communication with the secondary resonator chamber.

4. The muffler assembly as set forth in claim 1, wherein the primary and secondary muffler conduits are perforated tubes and wherein at least one of the primary resonator chamber and the secondary resonator chamber contains sound dampening material.

5. The muffler assembly as set forth in claim 1, wherein the primary resonator cross-sectional area (A1) and the primary muffler conduit cross-sectional area (a1) are substantially perpendicular to exhaust flow through the primary exhaust flow path and wherein the secondary resonator cross-sectional area (A2) and the secondary muffler conduit cross-sectional area (a2) are substantially perpendicular to exhaust flow through the secondary exhaust flow path.

* * * * *